United States Patent [19]
Fork

[11] Patent Number: 6,137,523
[45] Date of Patent: *Oct. 24, 2000

[54] REDUCING PIXEL FOOTPRINT IN A LIGHT EMITTER ARRAY USING ORGANIC LIGHT EMITTING DIODES

[75] Inventor: David K. Fork, Palo Alto, Calif.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/785,230

[22] Filed: Jan. 17, 1997

[51] Int. Cl.$^7$ ........................................... B41J 2/47
[52] U.S. Cl. ........................................... 347/237; 347/247
[58] Field of Search ................................... 347/237, 238, 347/239, 240, 130, 247; 257/40

[56] References Cited

U.S. PATENT DOCUMENTS

| | | | |
|---|---|---|---|
| 4,535,341 | 8/1985 | Kun et al. | 347/237 |
| 4,855,760 | 8/1989 | Kanayama | 347/240 |
| 4,856,920 | 8/1989 | Sanders, Jr. | 400/124 |
| 5,043,743 | 8/1991 | Habets et al. | 347/239 |
| 5,424,560 | 6/1995 | Norman et al. | 257/40 |
| 5,623,300 | 4/1997 | Itoh et al. | 347/237 |
| 5,693,956 | 12/1997 | Shi et al. | 257/40 |
| 5,724,055 | 3/1998 | Omae | 347/130 |
| 5,751,263 | 5/1998 | Huang et al. | 347/238 |

*Primary Examiner*—N. Le
*Assistant Examiner*—Lamson D. Nguyen
*Attorney, Agent, or Firm*—Oliff & Berridge, PLC

[57] ABSTRACT

An integrating xerographic light emitter array includes circuitry for using organic light emitting diodes (OLEDs) operated at modest light levels to expose a photoreceptor drum or belt. This is accomplished by staging an array of the emitters in the slow scan direction and clocking the data through pixel driving shift registers synchronously with the movement of a photoreceptor past the array in the slow scan direction. Increased emitter lifetime and the ability to operate at lower light levels are achieved in proportion to the number of stages. The method for operating the xerographic light emitter array includes transmitting data signals to the first row pixels, shifting the data signals down the columns synchronously with photoreceptor movement and supplying current to drive the OLEDs. Multicolor devices for xerocolography and tandem or multipass color architectures are straightforward extensions of this design.

28 Claims, 5 Drawing Sheets

FIG. 5

REDUCING PIXEL FOOTPRINT IN A LIGHT EMITTER ARRAY USING ORGANIC LIGHT EMITTING DIODES

BACKGROUND OF THE INVENTION

1. Field of the Invention

This invention relates to xerographic imagers using a light emitter array. In particular, this invention is directed to architectures, characteristics and methods of using a time delay and integration technique with shift registers and organic light emitting diode (OLED) printbars used in such xerographic light emitter arrays.

2. Technical Background

One of the fundamental design challenges for xerographic imaging is getting enough light to the photoreceptor at sufficient print speed while providing adequate service lifetime of the printbar. Rapid progress in OLEDs has produced devices which emit light levels greater than computer monitors (300 cd/m$^2$) and fluorescent tubes (3000 cd/M$^2$) in both white and in colors collectively spanning the visible spectrum.

Lifetime studies of OLEDs indicate that diode lifetime is determined to first order by the total charge passed through the OLED. Thus the OLEDs operate for short times at high brightness or for long times at low brightness. The lower end of the OLED brightness range is most stable, generally sustaining lifetimes of greater than 10,000 hours. The higher end of the OLED brightness range is less stable. For example, OLED devices operating at 1500 cd/m$^2$ currently have sustainable lifetimes of only about 500 hours.

In a one-dimensional page-width array of such OLEDs there is not currently enough brightness to print at a reasonable speed with reasonable reliability for commercial uses. Table 1 outlines the technical data for a xerographic printer using a single row OLED printbar having OLED emitters operating at 1500 cd/M$^2$. The printbar is illuminating a photoreceptor requiring about 7.5 ergs/cm$^2$. Thus, the print speed of the single row devices is about 0.29 pages/min. Moderate print speeds are above five pages/min, and a more desirable print speed is about 30 pages/min. The brightness deficit determined by this rough calculation is about 100x, especially when considering that the print speed calculation for the single row page-width array of OLEDs leaves no room for dead time. Actual inorganic diode based printbars typically have a duty cycle well under 50%, in part to minimize blur in the process direction.

Furthermore, the calculated print-speed is the speed before degradation, where the lifetime for the devices is the time to 50% output decay.

TABLE 1

TECHNICAL DATA FOR A CONVENTIONAL SINGLE ROW OLED PRINTBAR

| Light Emitter Inputs | | |
|---|---|---|
| Average Wavelength | 590 | nm |
| Avg. Luminous Efficacy | 450 | 1 m/W |
| LED Brightness | 1500 | cd/m$^2$ |
| LED Current Density | 25 | mA/cm$^2$ |
| Display Voltage | 20 | Volts |
| Number of Rows | 1 | |
| Array Fill Factor | 88% | |

TABLE 1-continued

TECHNICAL DATA FOR A CONVENTIONAL SINGLE ROW OLED PRINTBAR

| Optical Inputs | | |
|---|---|---|
| Lens Transmittance | 90% | |
| Lens Effective F# | 4.765 | |
| Lens Efficiency | 1.0% | |
| Photoreceptor Dose | 7.5 | erg/cm$^2$ |
| Page Property Inputs | | |
| Document Exc. Time | 0 | sec |
| Fast Scan Resolution | 300 | in$^{-1}$ |
| Slow Scan Resolution | 300 | in$^{-1}$ |
| Fast Scan Length | 14 | in |
| Slow Scan Length | 8.5 | in |
| Fractional Line Time | 100% | |
| Outputs | | |
| Surface Luminous Flux | 0.4712 | 1 m/cm$^2$ |
| Surface Radiance | 0.0010 | W/cm$^2$ |
| Surface Radiance | 10472.0 | ergs/sec · cm$^2$ |
| Photoreceptor Irradiance | 103.778 | ergs/sec · cm$^2$ |
| Pixel Size | 0.0085 | cm |
| Pixel Current | 1.79 | uA |
| Array Emitting Area | 0.26 | cm$^2$ |
| Array Width | 0.08 | mm |
| Array Emission | 27.50 | ergs/sec |
| Array Current | 6.623643 | mA |
| Array (Max) Power | 0.13 | Watts |
| Power Efficiency | 0.2094% | |
| Page Dose | 5758.05 | ergs |
| Page Time | 209.42 | sec |
| Line Time | 82.12 | msec |
| Print Speed | 0.287 | pages/min |
| Data Rate | 0.051 | MHz |

The brightness deficit is too large to compensate simply by running the diodes harder. For example, operating the OLEDs even briefly at 15000 cd/m$^2$ would require such a high bias that the OLEDs would quickly become inoperative Furthermore, doing so would only increase the print speed of the single row array to 3 pages/minutes. In addition, the total lifetime print volume of the xerographic imager (<9,000 pages) is insufficient.

Commonly assigned U.S. patent application Ser. No. 08/785,233, filed concurrently herewith, entitled "Integrating Xerographic Light Emitter Array with Grey Scale," the disclosure of which is incorporated herein by reference in its entirety, discloses one approach for using OLEDs operated at modest light levels to expose a photoreceptor drum or belt. This is accomplished by staging rows of emitters in the slow scan direction and moving the object image in sychronization with the movement of a photoreceptor past the array in the slow scan direction. The entire printbar can be rewritten during each line time of the photoreceptor, which allows the exposure on any spot on the photoreceptor to be varied over a number of grey levels equal to the number of stages.

Commonly assigned U.S. patent application Ser. No. 08/785,231, to Fork, filed concurrently herewith, entitled "Self Replacing OLED Printbar," the disclosure of which is incorporated herein by reference in its entirety, proposes another way to extend the lifetime of an OLED- based printbar. This is accomplished by creating a plurality of OLED printbars on a substrate, having all printbars share common optics and selecting a working printbar element in the event of a printbar element failure. Thus, printing is accomplished from a single row of emitters which operate at a high brightness and current. When one row burns out or decays to a level insufficient for printing, that row is deactivated, a new row is activated and printing continues.

SUMMARY OF THE INVENTION

This invention provides a xerographic light emitter array including pixels arranged in columns and rows, with each pixel having a light emitter, shift registers associated with the columns of pixels, wherein between successive line times, the shift registers incrementally shift data signals down the columns in a slow scan direction synchronously with movement of a photoreceptor. These shift registers may include shift register stages, wherein each of the shift register stages is associated with a row of pixels, and wherein the data signal advances one shift register stage between successive line times.

The xerographic light emitter array may also include first and second clock lines that alternate in values, wherein the value or state of the second clock line is always opposite that of the first clock line, data lines oriented with the columns of pixels and two power supply lines also oriented with the columns. Each pixel may include a two-phase shift register stage with a first phase half-stage and second phase half-stage that pass the light emission signal that controls activating a drive transistor. The drive transistor passes a drive current to its light emitter. The clock and power supply lines can be shared between adjacent columns.

In addition, the light emitters may be positioned over the transistors, clock lines, data lines and power supply lines. The transistors may be at least NMOS thin film transistors (TFTs), PMOS TFTs, or CMOS TFTs made from polysilicon, amorphous silicon or cadmium selenide.

In a second preferred embodiment, the xerographic light emitter array may include a plurality of drive lines for each column, wherein first ends of the drive lines are connected to a corresponding shift register and second ends of the drive lines are connected to the corresponding pixel in the column. The light emitter can emit light in any color suited to the photoreceptor, or a mixture of colors, including white.

This invention also provides a method for operating a xerographic light emitter array including arranging pixels into rows and columns, transmitting light emission signals to the first row of pixels between successive line times and shifting the light emission signals from the first row of pixels throughout all the rows of pixels synchronously with photoreceptor movement. The method also supplies a current to drive the light emitters.

A more complete understanding of this invention can be obtained by considering the following detailed description in conjunction with the accompanying drawings.

BRIEF DESCRIPTION OF THE DRAWINGS

The invention is illustrated in the accompanying drawings wherein like index numerals indicate like parts, in which.

DETAILED DESCRIPTION OF PREFERRED EMBODIMENTS

As described in detail below, this invention provides a way to use emitters such as OLEDs operating at modest light levels to expose a photoreceptor drum or belt. This is accomplished by staging an array of emitters in the slow scan direction and clocking the data through pixel driving shift registers synchronously with the movement of the photoreceptor through the array in the slow scan direction. Increased emitter lifetime and the ability to operate at lower light levels are achieved in proportion to the number of stages. Greater exposure uniformity also results by virtue of each photoreceptor spot receiving light from an ensemble of emitters. Multi-linear color devices for xerocolography or highlight color are straightforward extensions of the preferred embodiments of this invention, and thus will not be discussed in detail herein.

Figure 1:
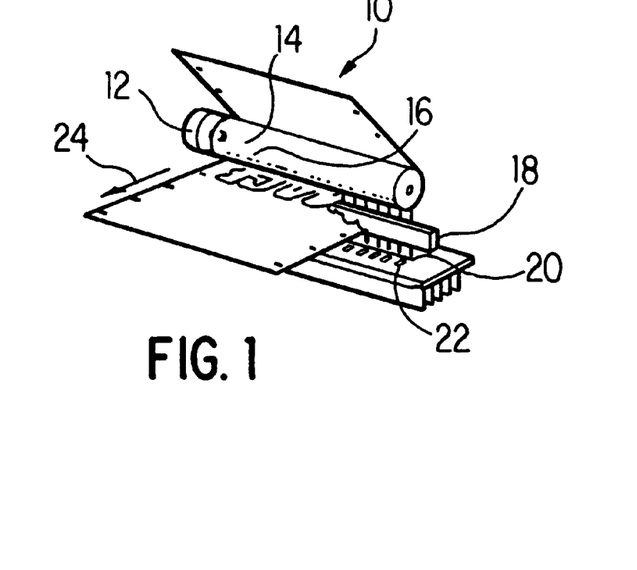
FIG. 1 is a schematic view of an exposure system of a xerographic printer.

FIG. 1 schematically shows an exposure system 10 for an LED array 20 in accordance with this invention. The exposure system 10 includes a position encoder 12, a photoreceptor 14, an imaged line 16, a lens array 18, a LED array 20 and control electronics 22. As the photoreceptor 14 drum rotates, data propagates through the LED array 20 at the same velocity. In other words, the exposure system 10 stages the LED array 20 in the slow scan direction 24 and moves the object image within the LED array 20 synchronously with the rotation of the photoreceptive drum 14. Because each photoreceptor spot receives light from an ensemble of emitters, the exposure system 10 provides greater uniformity when exposing the photoreceptive drum 14.

Figure 2A:
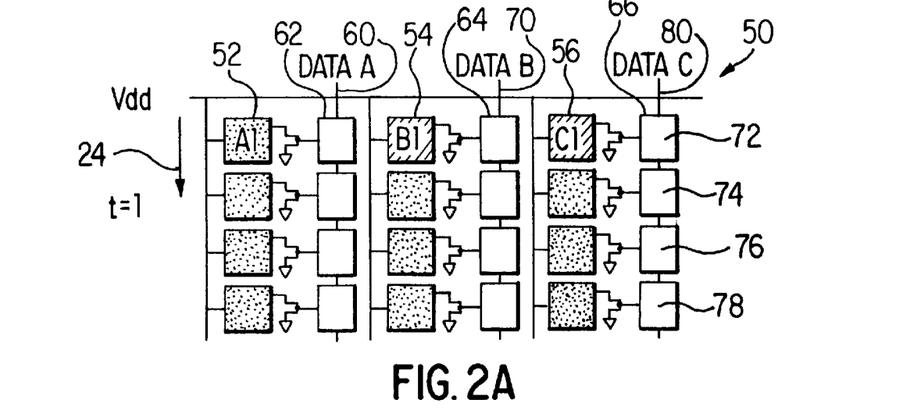
FIG. 2A is a schematic view of data flow in a staged light emitting diode array at a first successive line time in accordance with a first preferred embodiment of the invention.
Figure 2B:
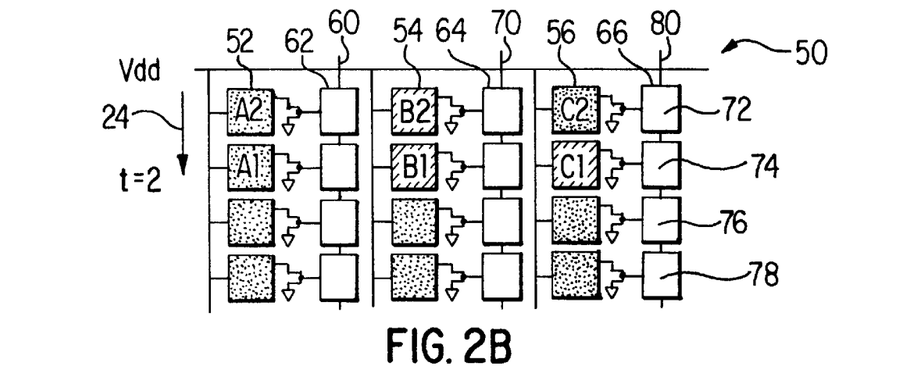
FIG. 2B is a schematic view of data flow in a staged light emitting diode array at a second successive line time in accordance with the first preferred embodiment of the invention
Figure 2C:
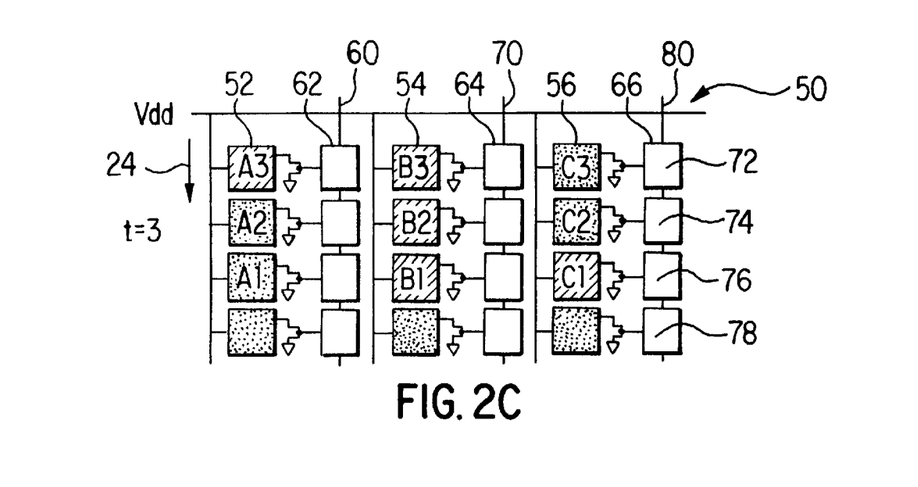
FIG. 2C is a schematic view of data flow in a staged light emitting diode array at a third successive line time accordance with the first preferred embodiment of the invention.

FIGS. 2A–2C illustrate a schematic view of the data flow in a 4-stage light emitting diode array 50 at three successive line times or intervals. The staged array 50 includes parallel columns of light emitting pixels 52, 54, 56. Each light emitting pixel column 52, 54 and 56 has shift register 62, 64 and 66, respectively, which clocks light emission signals Data A, Data B and Data C from data lines 60, 70 and 80 in the slow scan direction 24. Each light emitter in the columns 52, 54 and 56 is driven by a current source which is gated by a tap leading from the corresponding shift register stage 72, 74, 76 and 78 of the shift registers 62, 64 and 66. As the photoreceptor drum or belt 14 moves, the light emission signals Data A, Data B and Data C are clocked through the stages 72–78 of the shift registers 62, 64 and 66 at the same velocity.

FIG. 2A illustrates the staged array 50 during a first line time. A first set of light emission signals control passage of current for driving the light emitters of the first row such that the light emitters of the pixels in the first row of columns 54 and 56 emit light.

FIG. 2B illustrates the staged array 50 during a second line time. The light emission signals that were applied to the first row of pixels during the first line time are clocked into the second row such that the light emitters of the pixels in the second row of columns 54–56 emit light. A new set of light emission signals is input to the first row of pixels such that the light emitter of the pixel in the first row of column 54 emits light.

FIG. 2C illustrates the staged array 50 during a third line time. The first set of light emission signals are clocked from the second row to the third row of pixels such that the light emitters of the pixels in the third row of columns 54–56 emit light. The second set of light emission signals are simultaneously clocked from the first row to the second row of pixels such that the light emitter of the pixel in the second row of column 54 emits light. A new set of light emission signals is input into the first row of pixels such that the light emitters of the pixels in the first row of columns 52 and 54 emit light.

As the photoreceptive drum or belt 14 moves, the light emission signals are clocked through the stages 72–78 of the shift registers 62, 64 and 66 at the same velocity. As a result, each photoreceptor spot is exposed for a duration of time extended by the number of stages in the array 50. An advantage of this integration is that columnar non-uniformities in the array are averaged over the number of stages in the array 50.

Figure 3:
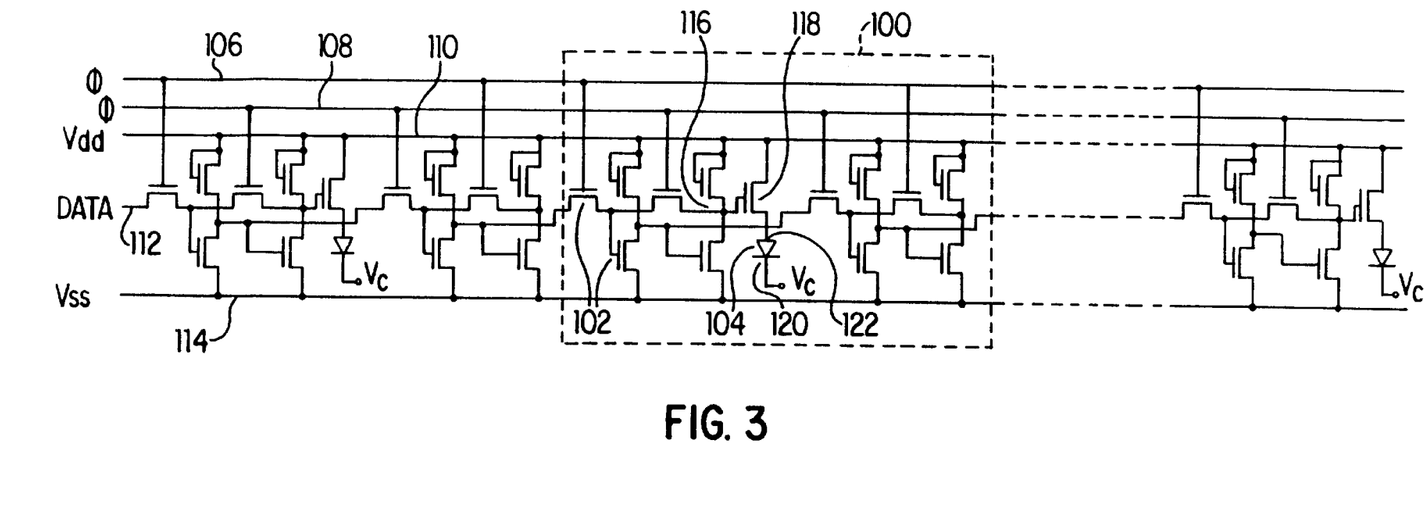
FIG. 3 is a circuit diagram of a column of LED pixels and the corresponding shift register circuitry in accordance with the first preferred embodiment of the invention.

FIG. 3 shows a circuit diagram for a column of LED pixels 100 and their shift register TFTs 102. The dashed box indicates one individual pixel 100 shift register stage and its associated LED 104. This two-phase shift register includes thirteen TFTs 102 per pixel 100. Two clock lines 106 and 108, a data line 112 and two voltage supply lines 110 and 114 are needed for each column. The clock lines 106 and 108 and the voltage supply lines 110 and 114 can be shared with adjacent columns. Thus, an average of only three lines are required per column. The diode 104 is driven by a drive transistor 118 tapped off the first half- register stage 116 of each register stage. The area consumed by the thin film transistors 102 and the associated wiring may require placing the diode 104 on top of the circuitry of the pixel 100 to maximize the fill factor. This will work best if the top electrode of the diode 104 is transmitting.

FIG. 3 further shows an anode 122 of the diode 104 connected to the source of the drive transistor 118. However, the organic layers and the cathode 120, which may be a magnesium-silver alloy or other low work function material of the diode 104, are preferably formed by a continuous layer that is not patterned at the pixel level. Spreading resistance can be used instead of organic layer patterning to control pixel-to-pixel interactions. Thus, in this embodiment, only the anode layer needs to be broken up into isolated pixels 100. If emission through the top electrode is required, the emission may be achieved by various means such as making a transparent cathode 120 for the circuit in FIG. 3, or by using a transparent anode 122 which may be indium tin oxide in a common anode device.

If it is desirable to operate the diodes 104 with less than 100% duty cycle, for example to reduce blur in the process direction, the diode 104 may be forced to be operative only within a reduced interval of each line time. This can be done for example, by placing a time-varying voltage on the common electrode, $V_c$.

One particular advantage of OLEDs is that they may be spun cast or otherwise deposited on a wide variety of media, including existing circuitry. The depositing of the OLEDs on top of the circuitry for each pixel may be referred to as "monolithic integration." The opacity of thin film electronics was a problem for similar devices based on known liquid crystal light valve arrays, because such devices operate in transmission. However, with a suitable top-emitting diode architecture, the 3-D integrability (i.e., monolithic intergration) of OLEDs overcomes this limitation because OLEDs are inherently emissive devices. A further drawback to such an approach with liquid crystal light valves instead of OLEDs is their slow response time, which at reasonable print speeds would cause a reduction of the modulation transfer function.

Figure 4:
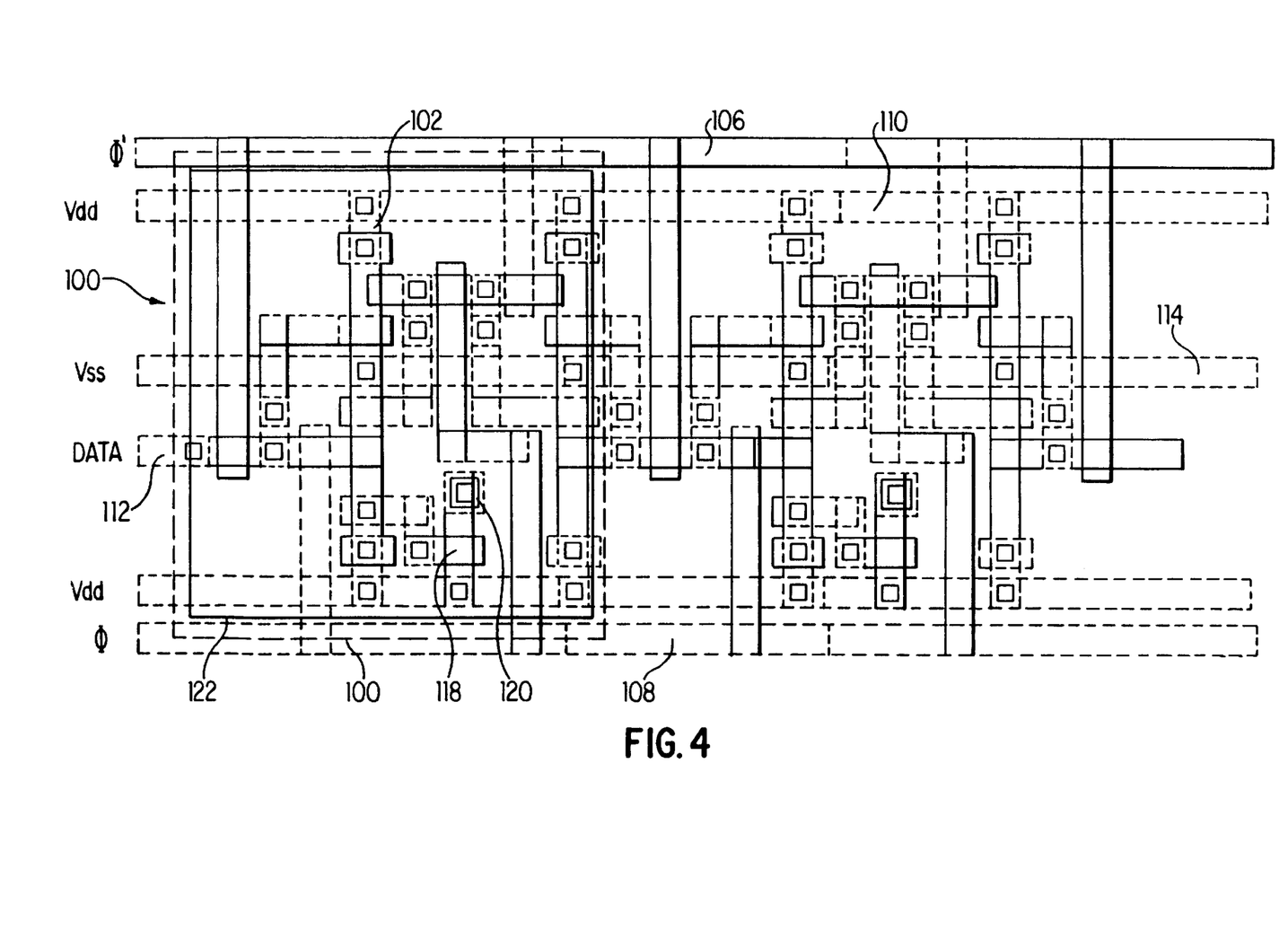
FIG. 4 is a preferred schematic layout of a single pixel and shift register stage in an array column for implementing the circuit diagram of FIG. 3.

FIG. 4 illustrates a topologically suggestive schematic of the pixels 100 of FIG. 3 and its underlying electronics. For illustration purposes, the drive electronics for the pixels 100 are implemented using large-area-processed NMOS polysilicon TFTs, although designs using amorphous silicon, cadmium selenide or single crystalline silicon, and either PMOS or CMOS may also be considered. In the case of CMOS, the load transistors are replaced with p-channel TFTs.

In this example, the OLEDs 104 operate at voltages around 12 volts. The line time for each pixel 100 is about 3.5 milliseconds. Thus, the shift register can easily run at this voltage using polysilicon TFTs with a width and a length of about 5 microns. The TFT cell size, including source and drain contacts, and with a 1.5 micron overlap, is 8×18 microns. This density is currently available with large area processing.

The current requirement of the pixels 100 at 300 SPI is about 2 microamps ($\mu$A). A polysilicon TFT of 5 microns width and a mobility of 30 cm$^2$/V·sec is sufficient to provide this minute quantity of current. An amorphous silicon current source may be impractical because of its lower mobility, which means that the transistor alone may be wider than a pixel.

The large-box in FIG. 4 represents an individual pixel 100. The anode 122 of the OLED 104 is a few percent smaller than the pixel 100 and contacts the array through a window to the cathode contact 120.

The size of the pixel 100 and therefore the printing resolution may be limited by the density at which the shift register transistors 102 can be packed together on the substrate. This depends both on the lithographic resolution limits and on the semiconductor properties available for the transistors 102. Based on 5-micron wires on 5-micron spacings, the size of the pixel 100 is about 85 microns by 85 microns, or about 300 SPI.

There are many layout variations possible for implementing the circuits described herein with respect to the topology of the devices, the layers used for their fabrication, and the methods of processing. The description set forth with respect to FIG. 4 is not intended to be limiting.

Figure 5:
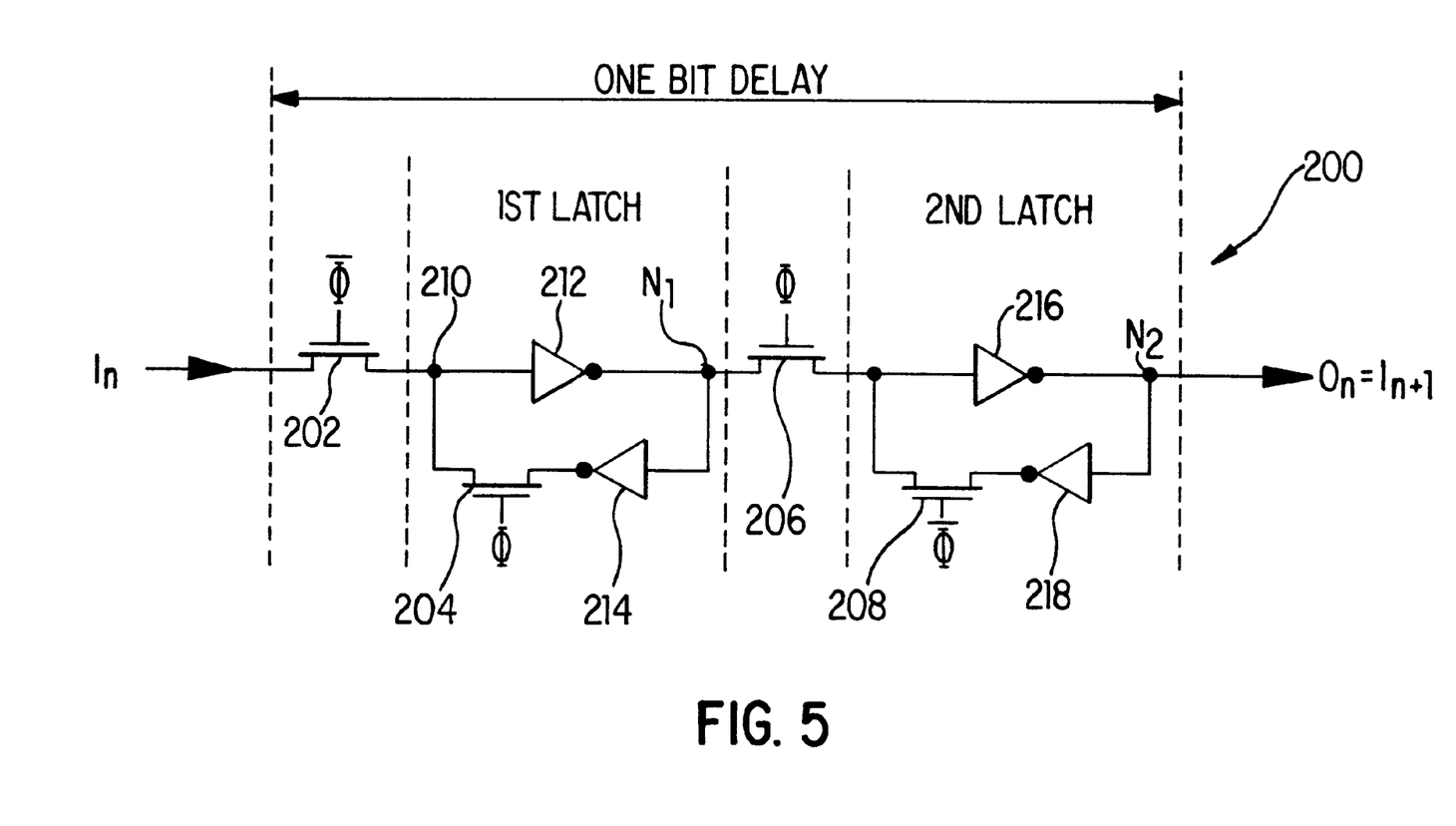
FIG. 5 is a circuit diagram of a static two-phase NMOS shift register stage for an individual pixel in accordance with a second preferred embodiment of the invention.

FIG. 5 shows a two-phase one-bit-delay shift register circuit 200 for each pixel 100 in accordance with a second embodiment of this invention. This approach requires at least 13 TFTs per pixel, 6 TFTs for each stage of the two-phase shift register stage and one drive TFT (not shown) which passes current to the OLED (not shown). The area consumed by the transistors and wiring will likely require placing the diode on top of the electronic circuitry in order to maximize the fill factor.

As shown in FIG. 5, a first phase clock line $\overline{\Phi}$ is connected to the gate of a first TFT 202. When the first phase clock line $\overline{\Phi}$ goes high, a data signal $I_n$ propagates through the first TFT 202 and sets node 210 to $I_n$. A first inverter 212 inverts the data signal $I_n$ at a node $N_1$ to $\overline{I_n}$.

An input of a second inverter 214 is connected to the output of the first inverter 212 at the note $N_1$. A second TFT 204 has its gate connected to a second phase clockline $\Phi$ and controllably connects the output of the second inverter 214 to the input of the first inverter 212. Thus, the second inverter outputs $I_n$.

When the state of the second phase clock line $\Phi$ goes high, the state of the first phase clock line $\overline{\Phi}$ goes low. Thus, the data signal $I_n$ is removed from the input of the first inverter 212. However the data signal $I_n$ propagates through second TFT 204 from the output of the second inverter 214 and thus continues to be applied to the first inverter 212. This regenerative feedback is characteristic of static shift registers, and permits the device to operate at a range of speeds from DC to a limiting frequency depending on the size and mobility of the transistors, and the capacitance and resistance of the wiring contacts.

At the same time the second phase clock line $\overline{\Phi}$ turns on the first TFT 206 of the second stage of the two-phase shift register 200, the data signal $\overline{I_n}$ propagates through the first TFT 206 of the second stage, is inverted back to $I_n$ by a third inverter 216 and is output as a one-bit-delayed data signal $O_n$.

A fourth inverter 218 is connected to the output of the third inverter 216 at the node $N_2$. The second TFT 208 of the second stage has its gate connected to the first phase clock signal $\overline{\Phi}$ and controllably inverts the output $O_n$ of the fourth inverter 218 to $\overline{O_n}$ and applies $\overline{O_n}$ to the input of the third inverter 216.

When the second phase clock line $\Phi$ goes low, the first phase clock line $\overline{\Phi}$ simultaneously goes high and the data signal $\overline{O_n}$ from the fourth inverter 218 is applied by the second TFT 208 to the input of the third inverter 216. The data signal $\overline{O_n}$ is then re-inverted to $O_n$, by the third inverter 216, such that the output remains $O_n$. Therefore, under this embodiment, each data signal $O_n$ is equal to a corresponding data signal $I_n$ after a one bit time delay.

Figure 6:
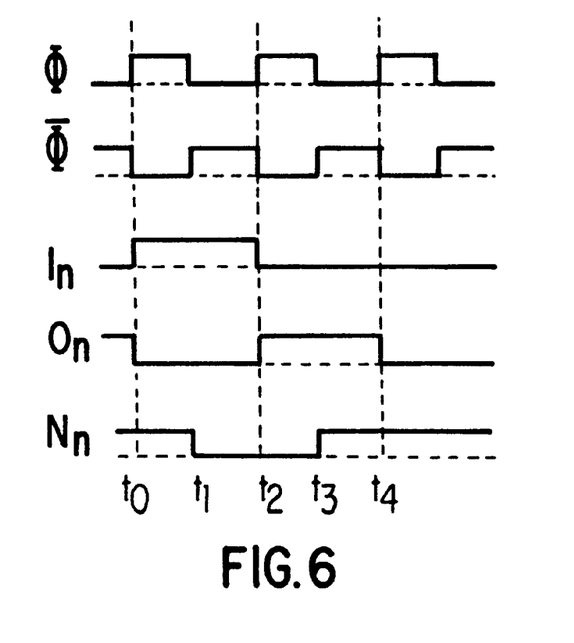
FIG. 6 is a timing diagram of the static two-phase NMOS shift resister of FIG. 5.

FIG. 6 shows a timing diagram for the operation of the two-stage one-bit-delay shift register shown in FIG. 5. As shown in FIG. 6, at time $T_0$, the second phase clock signal $\Phi$ goes high while the first phase clock signal $\overline{\Phi}$ goes low. Previously to $T_o$, the input signal $I_n$ was low, such that the inverted signal $\overline{I_n}$ at the node $N_1$ was high and thus the output $O_n$ was high. At time $T_o$, the input signal $I_n$ goes high simultaneously with the shift in state of the first and second phase clock signals $\overline{\Phi}$ and $\Phi$. Thus, the output signal $O_n$ goes low at time $T_o$.

Subsequently, time $T_1$, the second phase clock signal $\Phi$ goes low while the first phase clock signal $\Phi$ goes high. This applies the high-state input signal $I_n$ to the first inverter 212, changing the state of the signal at the first node $N_1$ from high to low. However, because the second stage clock signal $\Phi$ is low, the low signal at the first node $N_1$ is not applied to the third inverter 216 and the output of the second inverter 214, which is $I_n$ is not applied to the input of the first inverter 212.

Then, at $T_2$, the second phase clock signal $\Phi$ goes high while the first phase clock signal $\Phi$ goes low. This removes the input signal $I_n$ from the input to the first inverter 212, while simultaneously applying the input signal $I_n$ output from the second inverter 214 to the input of the first inverter 212. Thus, the input signal $I_n$ is effectively latched in the first phase of the two-phase one-bit-delay shift register. At the same time, the low-state inverted signal at the node $N_1$ is applied to the input of the third latch 216. The third latch 216 inverts the low-state output from the first latch 212. Thus, the state of the output signal $O_n$ changes from low to high.

The above outlined operation at times $T_1$ and $T_2$ for the first stage of the two-stage one-bit-delay shift register is repeated at times $T_3$ and $T_4$, except that the input signal In is now low. Further, at time $T_3$, the second phase clock signal $\Phi$ goes low while the first phase clock signal $\overline{\Phi}$ goes high. This removes the low-state signal at the node $N_1$ from the output to the third inverter 216, while applying the double-inverted output of the fourth inverter 218 to the input of the third inverter 216. This effectively latches the low-state signal at the node $N_1$ in the second stage of the two-stage one-bit-delay shift register.

Subsequently, at time $T_4$, the second phase clock signal $\Phi$ goes high while the first phase clock signal $\overline{\Phi}$ goes low. This again applies the output of the node $N_1$ to the input of the third inverter 216.

Figure 7:
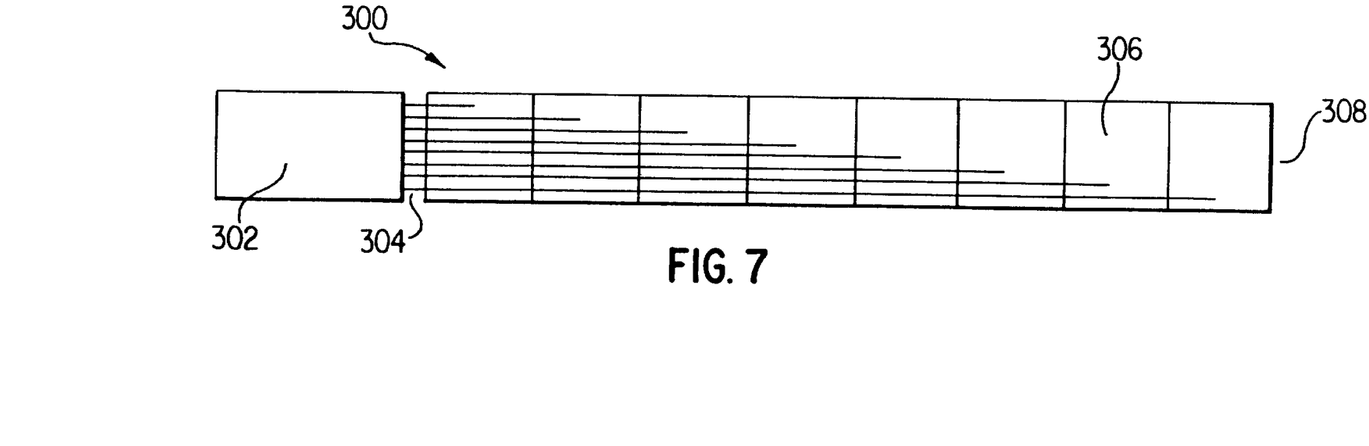
FIG. 7 is a schematic view of a fanout method for distributing drive lines to pixels in accordance with a third preferred embodiment of the invention.

A third embodiment of the invention, which physically separates the shift register from the column of pixels, is shown in FIG. 7. Each shift register 302 runs the drive lines 304 from each shift register stage 300 to the individual pixels 306 down a column 308. Using this approach, more area could be devoted to the shift register electronics. The shift register electronics would in principle be similar to those detailed above with the possible exception of their requiring an additional layer of metallization. However, this structure is limited to the density at which drive lines 304 can be placed within one pixel 306.

In this embodiment, the number of pixels 306 in a stage 300 may be doubled by bringing data in from the top and the bottom of the column 308. Thus, for example, for 80-micron-wide pixels 306, and 10-micron-pitch lines 304, 16 pixel columns 308 could be operated with this embodiment.

Due to the density of connections required to address a 300 SPI or greater resolution printbar, multiplexers of some type may be required, since the wire bonding density limit is about 200 SPI. The same process steps used to fabricate the pixel circuitry could be applied to creating the peripheral data multiplex circuitry. A small number of polysilicon multiplexers could distribute the entire data flow to the array minimizing the number of wire bond connections.

The technical data for an integrating xerographic light emitter array is illustrated in Table 2. In Table 2, a refresh rate for each pixel is 3.5 milliseconds.

For lifetime and stability considerations, a brightness of 300 cd/m$^2$ was chosen in the red visible wavelength. A BZP photoreceptor requiring 7.6 ergs/cm$^2$ dose was chosen. Sixty-four stages of OLED elements were used in each column. The array size in the process direction is thus approximately 5 millimeters at 300 DPI, which is within the field width range of available selfoc relay lenses. The lens efficiency for a relay lens was assumed at about 1%. A 14' wide print drum or belt, an industry standard, was also assumed.

As specified, the emitter array 20 consumes about 5 watts and prints at 6.75 pages per minute. Depending on the type of photoreceptor used, up to about a four-fold increase in photosensitivity and print speeds can be achieved. The emitters can emit into less solid angles with dielectric microcavity mirrors or with surface microlens arrays, which would considerably enhance the 1% throughput efficiency used in this example.

TABLE 2

TECHNICAL DATA FOR 300 DPI OLED EMITTER ARRAY OPERATED IN ACCORDANCE WITH THE FIRST PREFERRED EMBODIMENT OF THE INVENTION

| Light Emitter Inputs | | |
|---|---|---|
| Wavelength | 633 | nm |
| Luminous Efficacy | 250 | 1 m/W |
| LED Brightness | 300 | cd/m$^2$ |
| LED Current Density | 20 | mA/cm$^2$ |
| Display Voltage | 15 | Volts |
| Number of stages | 64 | |
| Array Fill Factor | 90 | |
| Optical Inputs | | |
| Lens Transmittance | 90% | |
| Lens Effective F# | 4.765 | |
| Lens Efficiency | 1.0% | |
| Photoreceptor Dose | 7.5 | erg/cm$^2$ |
| Page Property Inputs | | |
| Document Exc. Time | 0 | sec |
| Fast Scan Resolution | 300 | in$^{-1}$ |
| Slow Scan Resolution | 300 | in$^{-1}$ |
| Fast Scan Length | 14 | in |
| Slow Scan Length | 8.5 | in |
| Fractional Line Time | 100% | |
| Outputs | | |
| Surface Luminous Flux | 0.942 | 1 m/cm$^2$ |
| Surface Radiance | 0.0004 | W/cm$^2$ |
| Surface Radiance | 3769.9 | ergs/sec · cm$^2$ |
| Photoreceptor Irradiance | 37.360 | ergs/sec · cm$^2$ |
| Pixel Size | 0.0085 | cm |
| Pixel Current | 1.43 | uA |
| Array Emitting Area | 17.43 | cm$^2$ |
| Array Width | 5.42 | mm |
| Array Emission | 647.89 | ergs/sec |
| Array Current | 346.838 | mA |
| Array (Max) Power | 5.20 | Watts |
| Quantum Efficiency | 0.1257% | |
| Page Dose | 5758.05 | ergs |
| Page Time | 8.89 | sec |
| Line Time | 3.49 | msec |
| Print Speed | 6.75 | pages/min |
| Data Rate | 1.21 | MHz |

This example illustrates the differences between the OLED emitter array and the single row OLED printbar outlined in Table 1. The print speed of the OLED emitter array printbar, 6.75 pages/minute, is about 24 times faster than the print speed of the single row printbar of Table 1, which is 0.287 pages/minute. With an emitter brightness of 300 cd/m$^2$, the array printbar of Table 2 should last several times longer than the single row printbar of Table 1.

In addition, the printbar of Table 2 outputs significantly larger amounts of light to the photoreceptor than the single OLED printbar of Table 1, due to the large number of stages of the array printbar. This allows the array printbar to print pages faster and to last longer than the single row printbar of Table 1.

The nature of the exposure on the photoreceptor drum or belt 14 is inherently binary. Since the data is clocked through a digital shift register, pixels are either "ON" or "OFF". An advantage of this integration is that column non-uniformities in the array are average over the number of stages in the array. By taking the design in FIG. 2 and individually addressing the VDD line of each column, various implementations of grey exposure can be achieved. Going beyond half-tone exposure requires extending the dynamic range of the emitter, which may not be desirable, since driving the diodes with a higher upper limit may shorten their lifetime.

A variation of this approach uses analog shift registers with amplifier taps to provide 12 bits of grey to each pixel diode. A drawback to this variation is that it requires a material with low carrier trapping defect density for implementing the analog shift registers with high transfer efficiency. This probably limits the substrate to single-crystal silicon. In addition, due to the size requirements of the substrate, the analog shift registers with amplifier taps may only be applicable in an array of limited size, or in a device which uses butted silicon die to extend the array dimensions.

Multi-wavelength arrays can be important for implementing pass color or highlight color printing. OLEDs can be fabricated in a variety of colors, depending on the organic material used and the types of dyes used. It is plausible that a trilinear array of time delay and integration emitters could be used to perform cyan, magenta and yellow xerocolography with adequate wavelength separation. A quadralinear array could be used to add process black, but the width of the array would have to be increased correspondingly.

A more attractive alternative may be to use separate arrays for each color. This may be more practical due to the quadratic rolloff in lens transfer efficiency. Another way to provide color printing with this type of array uses separate LED printbars in four separate print developing units to print three colors in addition to process black.

While this invention is described in detail herein with specific reference to certain illustrative embodiments, it is to be understood that there is no intent to be limited to these embodiments. For example, one of ordinary skill in the art at the time the invention was made would understand that different shift registers and electronics could provide additional embodiments of the pixel circuitry described herein. For example, dynamic shift registers could be used in lieu of the static shift registers described herein. In addition, a four-phase shift register would be used in lieu of the two-phase shift registers described herein. The aim is to cover all modifications, alternatives and equivalents falling within the spirit and scope of the invention as described by the following claims. The invention is applicable to all types of printing devices that use light beams to form images. Such printing devices include facsimile machines, copiers, printers, etc.

What is claimed is:

1. A xerographic light emitter array, comprising:
    a plurality of pixels arranged in a plurality of columns and a plurality of rows, each pixel includes a light emitter which is a monolithically integrated organic light emitting diode, each light emitter formed over circuitry for the corresponding pixel;
    a plurality of shift registers, each shift register associated with one of the columns of pixels and each shift register shifting a light emission signal, between successive line times, down a corresponding one of the plurality of columns in a slow scan direction synchronously with a movement of a photoreceptor;
    wherein, for each pixel, a drive current is controlled by the corresponding light emission signal to controllably drive the light emitter.

2. The xerographic light emitter array of claim 1, wherein each of the shift registers includes a plurality of shift register stages, each of the shift register stages associated with one of the rows of pixels and storing the light emission signal during a line time, wherein the light emission signal shifts between adjacent shift register stages between successive line times.

3. The xerographic light emitter array of claim 2, further comprising, for each of the columns, a plurality of drive lines having first ends connected to a corresponding one of the shift register stages and second ends, wherein each of the second ends is connected to the corresponding one of the pixels in the corresponding one of the columns.

4. The xerographic light emitter array of claim 1, further comprising:
  a plurality of first clock lines and a plurality of second clock lines, each of the first clock lines and each of the second clock lines oriented with at least one of the columns, wherein the second clock lines are set low when the first clock lines are set high and the second clock lines are set high when the first clock lines are set low;
  a plurality of data lines supplying the light emission signals to the shift registers, each of the data lines oriented with one of the columns of pixels; and
  a plurality of first power supply lines and a plurality of second power supply lines, wherein each of the first power supply lines and each of the second power supply lines are oriented with at least one of the columns.

5. The xerographic light emitting array of claim 4, wherein each of the pixels includes:
  a plurality of first phase transistors for passing a light emission signal from a corresponding one of the data lines;
  a plurality of second phase transistors for passing the light emission signal from the first phase transistors; and
  a drive transistor activated upon receipt of the light emission signal and passing the continual drive current to the corresponding light emitter through each of the line times based on the corresponding light emission signal stored in the second phase transistor.

6. The xerographic light emitter array of claim 5, wherein each of the first clock lines, each of the second clock lines, each of the first power supply lines and each of the second power supply lines are oriented with two adjacent columns.

7. The xerographic light emitter array of claim 6, wherein the OLED is positioned over at least one of the first phase transistors, the second phase transistors, the drive transistors, the corresponding one of the first clock lines, the corresponding one of the second clock lines, the corresponding one of the data lines, the corresponding one of the first power supply lines, and the corresponding one of the second power supply lines.

8. The xerographic light emitter array of claim 6, wherein the first phase transistors are first phase thin film transistors (TFTs), the second phase transistors are second phase TFTs and the drive transistors are drive TFTs.

9. The xerographic light emitter array of claim 8, wherein the TFTs are one of NMOS TFTs, PMOS TFTs and CMOS TFTs.

10. The xerographic light emitter array of claim 8, wherein the TFTs are made from at least one of polysilicon, amorphous silicon and cadmium selenide.

11. The xerographic light emitter array of claim 6, wherein at least one of the first phase transistors, the second phase transistors and the drive transistors is made from at least single crystal silicon.

12. The xerographic light emitter array of claim 6, wherein the OLED includes an anode layer and a cathode layer, the cathode layer made from a common layer of at least magnesium-silver alloy or another low work function material.

13. The xerographic light emitter array of claim 6, wherein the OLED includes an anode layer and a cathode layer, the anode layer made from a common layer of at least indium-tin-oxide and connected to the plurality of pixels.

14. The xerographic light emitter array of claim 1, wherein the light emitter emits light corresponding to one of white, cyan, magenta, yellow and black portions of an output image.

15. A method for operating a xerographic light emitter array, comprising:
  arranging a plurality of pixels into a plurality of columns and a plurality of rows, each of the pixels includes a light emitter which is a monolithically integrated organic light emitting diode, each light emitter formed over circuitry for the corresponding pixel;
  transmitting a plurality of light emission signals to the plurality of pixels of a first row of the rows between successive line times; and
  shifting, with a plurality of shift registers, the plurality of light emission signals applied to the first row down the columns synchronously with movement of a photoreceptor, each of the shift registers is associated with one of the columns of pixels.

16. The method of claim 15, wherein each of the shift registers includes a plurality of shift register stages, each of the shift register stages associated with one of the rows of pixels, the method further comprising supplying a current to drive the light emitters.

17. The method of claim 16, further comprising, connecting first ends of drive lines of each of the columns to a corresponding one of the shift registers and connecting second ends of the drive lines of each of the columns to corresponding ones of the pixels in the corresponding column.

18. The method of claim 15, further comprising:
  providing a plurality of first clock lines and a plurality of second clock lines, each of the first clock lines and each of the second clock lines oriented with at least one of the columns;
  setting the second clock lines low when the first clock lines are set high;
  setting the second clock lines high when the first clock lines are set low;
  providing a plurality of data lines for supplying light emission signals to the shift registers, each of the data lines oriented with one of the columns of pixels; and
  providing a plurality of first power supply lines and a plurality of second power supply lines, wherein each of the first power supply lines and each of the second power supply lines are oriented with at least one of the columns.

19. The method of claim 18, wherein each of the pixels includes:
  passing a light emission signal from a corresponding one of the data lines with a plurality of first phase transistors;
  passing the light emission signal from the first phase transistors with a plurality of second phase transistors;
  activating a drive transistor activated upon receipt of the light emission signal; and
  passing the continual drive current to the corresponding light emitter through each of the line times based on the corresponding light emission signal stored in the second phase transistor.

20. The method of claim 19, further comprising orienting each of the first clock lines, each of the second clock lines, each of the first power supply lines and each of the second power supply lines with two adjacent columns.

21. The method of claim 20, further comprising positioning the OLED over at least one of the first phase transistors, the second phase transistors, the drive transistors, the corresponding one of the first clock lines, the corresponding one of the second clock lines, the corresponding one of the data lines, the corresponding one of the first power supply lines, and the corresponding one of the second power supply lines.

22. The method of claim 20, wherein the first phase transistors are first phase thin film transistors (TFTs), the second phase transistors are second phase TFTs and the drive transistors are drive TFTs.

23. The method of claim 22, wherein the TFTs are one of NMOS TFTs, PMOS TFTs and CMOS TFTs.

24. The method of claim 22, further comprising making the TFTs from at least one of polysilicon, amorphous silicon and cadmium selenide.

25. The method of claim 20 further comprising making at least one of the first phase transistors, the second phase transistors and the drive transistors from at least single crystal silicon.

26. The method of claim 20, wherein the OLED includes an anode layer and a cathode layer and further comprising fabricating the cathode layer into a common layer of at least magnesium-silver alloy or another low work function material.

27. The method of claim 20, wherein the OLED includes an anode layer and a cathode layer, and further comprising fabricating the anode layer into a common layer of at least indium-tin-oxide and connecting the anode layer to the plurality of pixels.

28. The method of claim 15, further comprising emitting light from one of the emitters corresponding to one of white, cyan, magenta, yellow and black portions of an output image.

\* \* \* \* \*